United States Patent [19]

Kliemann et al.

[11] Patent Number: 4,486,365
[45] Date of Patent: Dec. 4, 1984

[54] PROCESS AND APPARATUS FOR THE PREPARATION OF ELECTRET FILAMENTS, TEXTILE FIBERS AND SIMILAR ARTICLES

[75] Inventors: Bruno Kliemann, Freiburg; Martin Stoll, Freiburg-Hochdorf, both of Fed. Rep. of Germany

[73] Assignee: Rhodia AG, Freiburg, Fed. Rep. of Germany

[21] Appl. No.: 419,619

[22] Filed: Sep. 17, 1982

[30] Foreign Application Priority Data

Mar. 29, 1982 [EP] European Pat. Off. ........ 82102620.0

[51] Int. Cl.³ ............................................. B29C 9/00
[52] U.S. Cl. ...................................... 264/24; 264/22; 264/26; 425/174.8 E
[58] Field of Search .................. 425/174.8 E; 264/10, 264/22, 24, 26, DIG. 75

[56] References Cited

U.S. PATENT DOCUMENTS

| 2,338,570 | 1/1944 | Childs | 264/10 |
| 2,810,426 | 10/1957 | Till et al. | 264/10 |
| 4,215,682 | 8/1980 | Kubik et al. | 425/174.8 E |
| 4,230,650 | 10/1980 | Guirgnard | 425/174.8 E |
| 4,266,918 | 5/1981 | Manley | 425/174.8 E |
| 4,316,716 | 2/1982 | Liu | 425/725 |

FOREIGN PATENT DOCUMENTS

| 46-37769 | 11/1971 | Japan | 264/24 |
| 48-1466 | 1/1973 | Japan | 264/24 |
| 1159573 | 7/1969 | United Kingdom | 264/10 |

*Primary Examiner*—Donald Czaja
*Assistant Examiner*—Mary A. Becker
*Attorney, Agent, or Firm*—Bucknam and Archer

[57] ABSTRACT

A method for the production of electret filaments or fibers from high molecular weight substances is described which consists of melting the substances and extruding them through die orifices, electrically charging, polarizing and cooling the formed filaments or fibers and the electrically charging and polarization is carried out immediately prior to the issuance or during the issuance from the die orifices while the substances are in a molten state. The device for electric charging and polarizing consists either of an electrode (2) provided with one point or several points (1) which except for the point or points (1) is coated with or surrounded by an electrically insulating material, one point (1) inside the die (3) being disposed directly in front or protruding into a die orifice (4) or of an electrode (9) provided with one point or several points (8) completely coated with or surrounded by an electrically insulating material, one point (8) inside the die (3) being disposed directly in front or protruding into a die orifice (4), and of a counterelectrode (10) which is not coated with or surrounded by an electrically or protruding into the die orifices (4).

10 Claims, 5 Drawing Figures

PROCESS AND APPARATUS FOR THE PREPARATION OF ELECTRET FILAMENTS, TEXTILE FIBERS AND SIMILAR ARTICLES

This invention relates to a method for the production of electret filaments, fibers or the like from thread-forming, high molecular weight substances in which method these thread-forming, high molecular weight substances are melted, are extruded through die orifices, are electrically charged with either a negative or positive sign, and electrically polarized to produce a stable electric field originating from the formed filaments, fibers or the like, and the formed filaments, fibers or the like are then cooled.

The invention also relates to an apparatus for carrying out the method of this application. A method for the production of a electret is described in German patent application No. 27 52 110, according to which a polymer of the styrene type is placed in the form of a layer between two glass plates and a constant voltage of about 20 kV to 60 kV is applied for 1 min. to 5 min.

Further, an apparatus is known from U.S. Pat. No. 3,571,679 for the production of electrets from non-conductors having an open or porous structure. The apparatus consists of two metal electrodes between which an electric field may be built and between which the non-conductive material, for example in the form of a filter mat of polyethylene terephthalate fibers from which an electret is to be formed, may be placed.

U.S. Pat. No. 3,998,916 describes a method for the production of a fibrous filter which is provided with an electric charge, the fiber material of which consists of a non-polar, high molecular weight substance. The process consists of the following steps:

(a) film or foil, for example of polypropylene, is supplied at a rate of 12.2 m/min.;
(b) this foil is stretched in two stages;
(c) while being heated on at least one side by means of several corona discharge elements, the foil is provided with an electric homogeneous charge;
(d) the electrically charged foil is fibrillated or defibered;
(e) the fiber material is collected; and
(f) a filter is formed from the collected fiber material.

Further French patent application No. 2,416,535 describes a method for the production of an electret in the form of a fiber mat. The method is characterized by the following steps:

(a) a fiber-forming material with a specific resistance of at least $10^{14}$ Ohm/cm (probably what is meant is "... with a specific electric resistance of $10^{14}$ Ohm cm ...") is melt-spun, a gas stream of high velocity then acts on the material after it issues from the die orifices, so that this material is drawn and thus fibers are formed;
(b) the formed fibers in the still plastic stage are bombarded with electrically charged particles, that is just below the die orifices; and
(c) the fibers are collected when they have cooled sufficiently.

Polypropylene is named as an example of fiber-forming material.

U.S. Pat. No. 2,740,184 describes the production of electrically charged threads, fabrics and the like for use in filters, among others. The threads or fabric are placed between two electric heating elements or are made to run through between them. After turning the heating elements on, heating occurs and the threads or fabric are softened. Thereafter, with the aid of heating elements which serve at the same time as electrodes, an electric charge is applied on the threads or fabric; then they are cooled under the influence of the electrostatic field. The threads, fabrics and the like may consist for example of polystyrene, ethyl cellulose or vinyl polymers.

A disadvantage in some of these known methods and apparatuses, however, is that the electrodes, by means of which an electric charge is applied on the structures to be charged, such as foils, threads, fabrics, etc., usually are not applied directly on these structures, and especially in a continuous mode of operation—as is normally desired—cannot be brought in direct contact with these structures. An interspace, usually filled with air, thus exists between the electrodes and the structures to be charged electrically. Consequently, a higher voltage or an electric field of greater strength must be applied for the electret formation than when the electrodes are in direct contact with the structures to be charged.

Another disadvantage of the known methods and apparatuses is that by them or with them an electric charge can usually be applied or introduced only on or in the outer layer of the structures to be charged electrically and the introduction of an electric charge into the interior of the structures to be transformed into electrets is difficult with the known methods.

Another disadvantage of the known methods and apparatuses for the production of electret filaments or fibers is that a correct dosing and centering of the electric charges is very difficult. This is true especially of the method described in French patent application No. 2,416,535, because there high speeds are used and very fine fibers, i.e. fibers of low titer, are formed.

In electret manufacture the application of the electric charge on the structures to be electrically charged and the electric polarization of the structures to be polarized are preferably carried out at elevated temperature, which means that these structures must be heated. Another disadvantage of most of the known methods for electret manufacture is that the elevated temperature needed for forming the structures to be charged and polarized, such as filaments or fibers, cannot be used; finished structures are reheated just before or during the application of the electric charge or polarization. Only in the process described in French patent application No. 2,416,535, the heat needed for melt spinning is used, at least partially, also for the electret manufacture. However, also in that process, the electric charge is applied only on the already formed fibers which, while still plastic, are cooled off considerably, compared with their state in the interior of the spinnerette.

An object of the present invention is to provide a method for the production of electret filaments, fibers or the like, which permits to avoid the disadvantages of the known methods.

This problem is solved according to the invention by a method for the production of electret filaments, fibers or the like from thread-forming, high molecular weight substances, which consists of melting these thread-forming, high molecular weight substances, extruding the molten substances through die orifices, electrically charging, either with negative or positive electricity, and electrically polarizing for the generation of a stable electric field originating from the formed filaments, fibers or the like, cooling the formed filaments, fibers or the like, and the step of electrically charging, either with negative or with positive electricity, and the electric polarization for the generation of a stable electric field originating from the formed filaments, fibers or the like, is carried out immediately before or during the issuance of the thread-forming, high molecular weight substances from the die orifices on the substances which are then in a molten state.

According to a preferred embodiment of the method of the invention, each of the formed filaments, fibers or the like is exposed immediately after its issuance from the die orifice to an electric field which exerts on the carriers of electric charge present in or on the filaments, fibers or the like a force perpendicular to and in the direction of the respective longitudinal axis of the filaments, fibers or the like.

Preferably the formed filaments, fibers or the like are cooled at the same time.

Another object of the invention is to provide an apparatus for carrying out the method of the invention.

To solve this problem, the apparatus comprises means for melting the thread-forming, high molecular weight substances, a die with die orifices, means for electrically charging and polarizing, means for cooling the formed filaments, fibers or the like. Specifically, the apparatus is characterized by the following elements:

1. The device for electrically charging and for polarization consists of:
    1.1 an electrode provided with one or more points, which electrode except for its point or points is coated with or surrounded by an electrically insulating material stable to the conditions prevailing in the interior of the die, one point being disposed in the interior of the die directly in front of a die orifice or protruding into a die orifice, with the electrode being connected to one terminal of a source of electric energy, the other terminal of this source being grounded,
    1.2 or an electrode provided with one or more points which is completely coated with or surrounded by an electrically insulating material stable to the conditions prevailing in the interior of the die, one point being disposed in the interior of the die directly in front of a die orifice or protruding into a die orifice, and of a counter-electrode which is not coated with nor surrounded by an electrically insulating material and which is inside the die but not disposed directly in front of the die orifices nor protruding into the die orifices, the electrically insulated electrode being connected to one terminal of a source of electric energy and the counter-electrode which is not electrically insulated, being connected to the other terminal of this source of electrical energy, and further the terminal of the electric energy source with which the electrically insulated electrode is connected being also grounded,
2. the die-plate containing the die orifices, or the entire die, consists of:
    2.1 either of an electrically insulating material stable to the conditions prevailing inside the die;
    2.2 or of an electrically conductive material stable to the conditions prevailing in the interior of the die;
        2.2.1 the die-plate or the entire die being then electrically insulated from the ground.

A preferred embodiment of the apparatus according to the invention is characterized by the fact that there is present on the exit side of the die directly contiguous to each die orifice and axially centered therewith, but without being in direct contact with the die, a hollow cylinder consisting of electrically conductive material, this hollow cylinder being connected with one terminal of a source of electric energy source and the other terminal of the electric energy source being grounded.

Preferably the hollow cylinders located on the exit side of the die are designed so that they serve at the same time as an arrangement for cooling the formed filaments, fibers and the like.

Within the scope of the present invention, the term "thread-forming, high molecular weight substances" is used to designate substances which can be melt-spun. For this purpose, the following substances, for example, are suitable:

Polyethylene terephthalate; polyethylene; polypropylene; polyvinyl chloride; polyvinyl acetate; polyvinylidene fluoride; polymethyl methacrylate; polystyrene; cellulose acetate; and mixtures of these polymers.

The thread-forming, high molecular weight substances which have a specific electric resistance of at least $10^{16}$ Ohm cm are preferred.

Several embodiments of the invention will be explained more specifically below with reference to the schematic drawings, of which.

Figure 1:
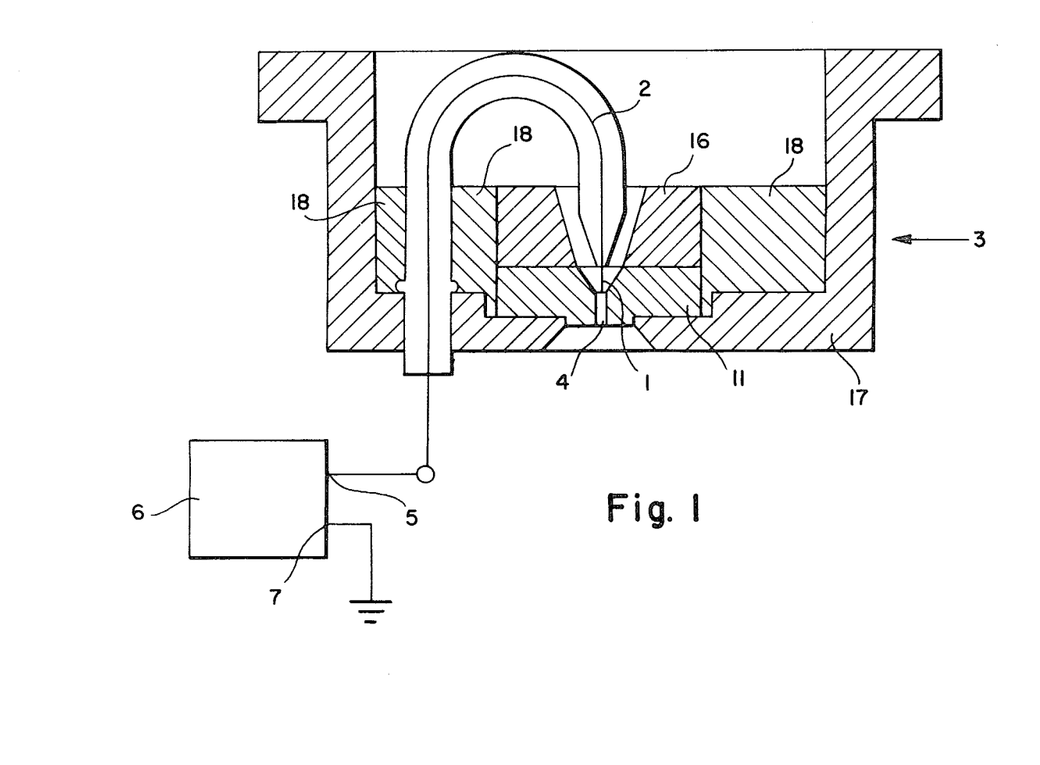
FIG. 1 illustrates in cross-section a die and a device for electrically charging, either negatively or positively, and for inducing electric polarization. The device shown therein for electric charging and for electrical polarization consists of the electrode 2 with point 1 which except for its point 1 is coated with or surrounded by an electrically insulating material stable to the conditions prevailing in the interior of die 3, point 1 being disposed in the interior of the die 3 directly in front of the die orifice 4.
Figure 2:
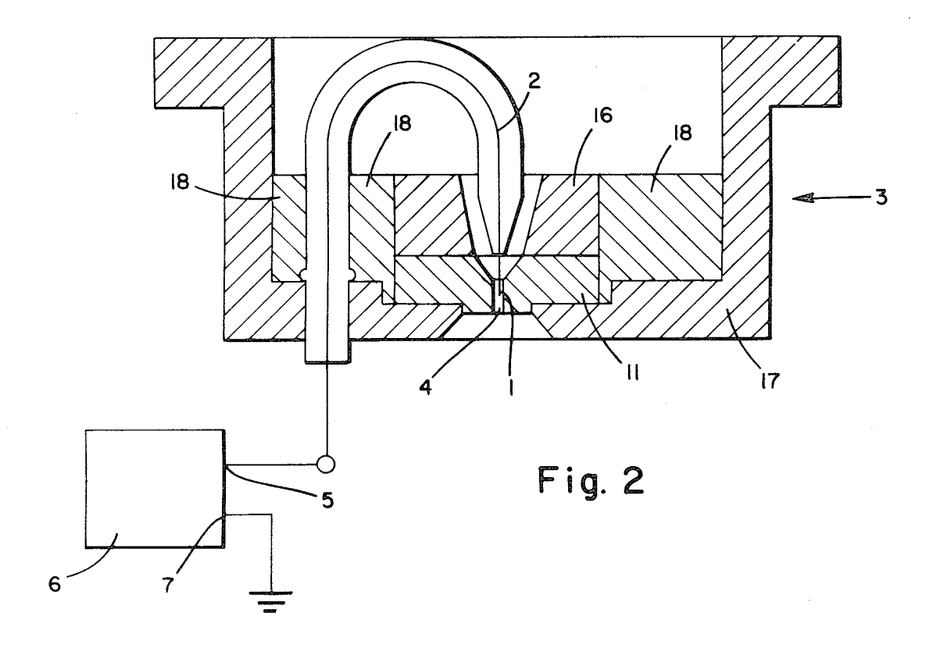
FIG. 2 illustrates in cross-section a die and a device for electrically charging, either negatively or positively, and for inducing electric polarization; the device shown for electric charging and inducing electric polarization consists of the electrode 2 with point 1 which except for its point 1 is coated with or surrounded by an electrically insulating material stable to the conditions prevailing within the interior of the die 3, with the point 1 here protruding into the die orifice.
Figure 3:
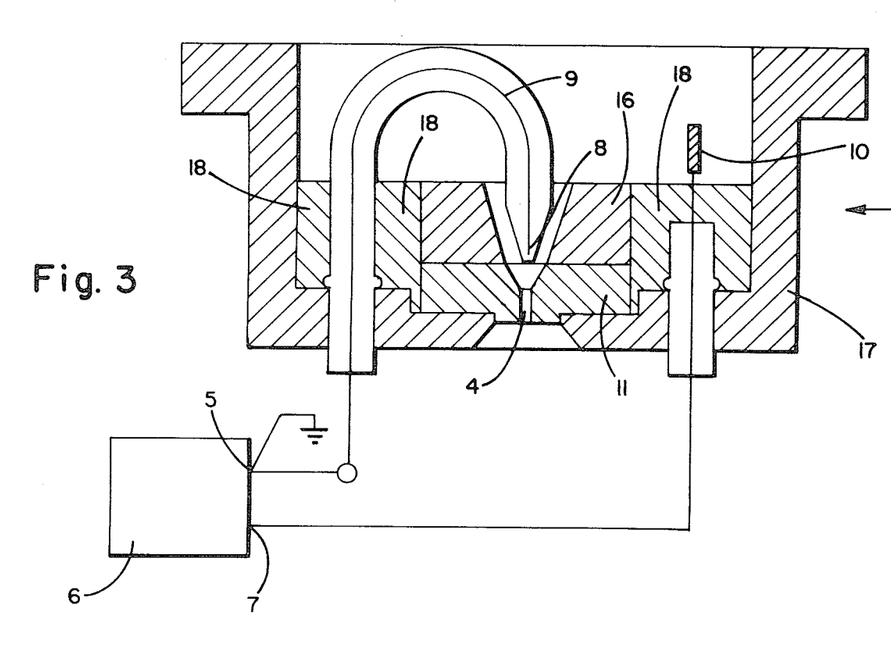
FIG. 3 illustrates in cross-section a die and a device for electrically charging, either negatively or positively, and for inducing electric polarization. In this embodiment, the device for electrically charging and for inducing electric polarization consists of the electrode 9 with point 8, which electrode is completely coated with or surrounded by an electrically insulating material stable to the conditions prevailing within the die 3, the point 8 within the die 3 being disposed directly in front of the die orifice 4. The device also consists of the counter-electrode 10 which is not coated with or surrounded by an electrically insulating material and which is disposed within die 3 not directly in front of the die orifice 4 nor protruding into the die orifice 4.
Figure 4:
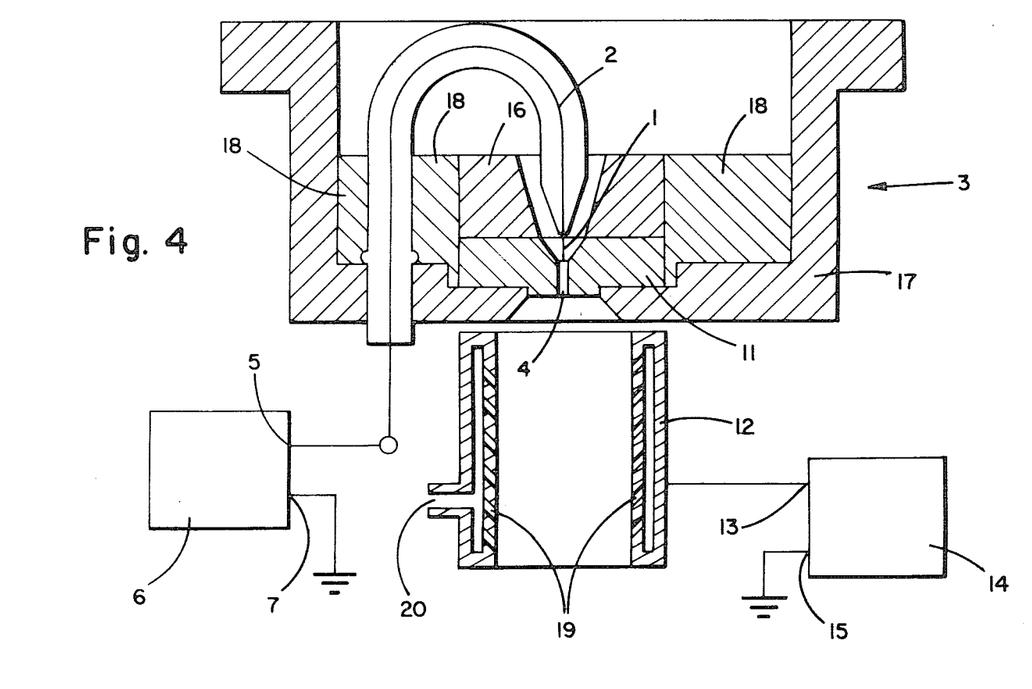
FIG. 4 represents a die, a device for electrically charging, either negatively or positively, and for inducing electric polarization, and a hollow cylinder consisting of electrically conductive material. The device for electrically charging and for inducing electric polarization shown corresponds to that shown in FIG. 1, and the hollow cylinder 12 is located on the exit side of the die 3 directly contiguous to the die orifice 4 and axially centered with it, but without being in direct contact with die 3.
Figure 5:
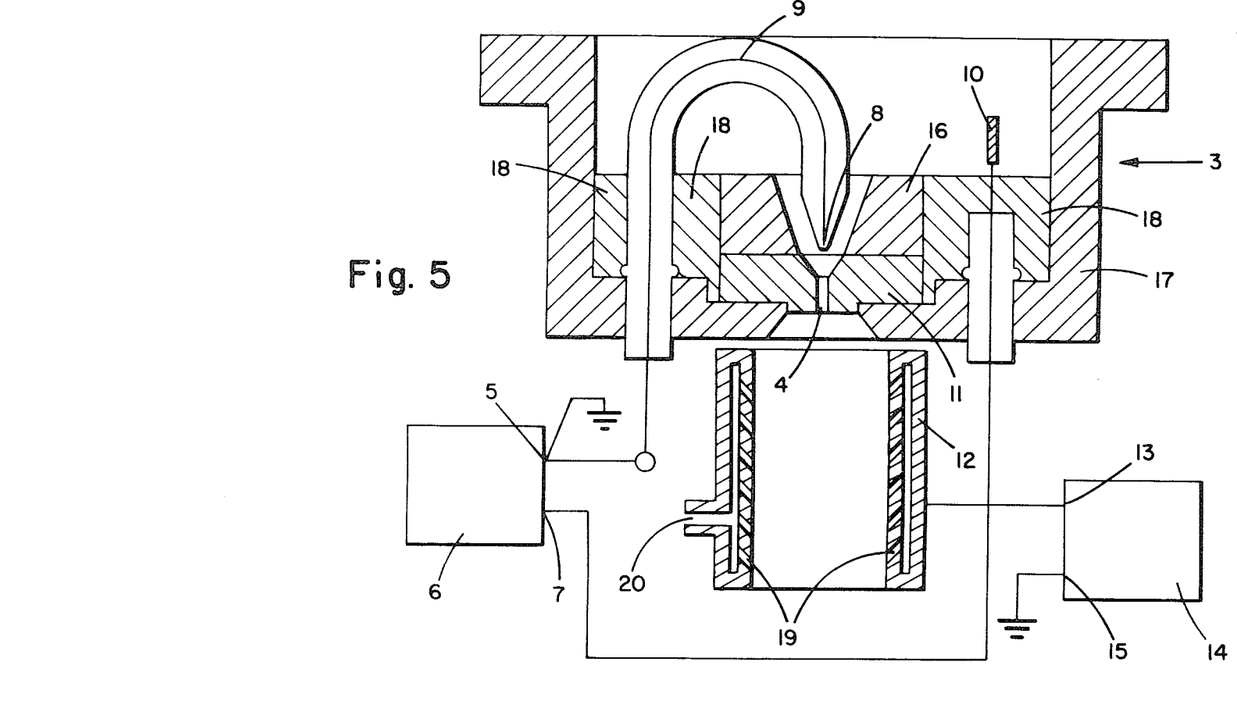
FIG. 5 shows a die, a device for electrically charging, either negatively or positively, and for inducing polarization, and a hollow cylinder consisting of electrically conductive material. The device for electrically charging and for inducing electric polarization shown corresponds to that shown in FIG. 3, and the hollow cylinder and its arrangement correspond to those of FIG. 4.

For the purpose of carrying out the method of the invention, a spindle extruder was used of the Type LSE of the company, Fourne, Bonn, Federal Republic of Germany, to which was attached a die according to FIGS. 1, 3 or 4.

The respectively electrodes and respective hollow cylinders were connected via lead cables to ungrounded and shortcircuit-protected constant voltage high tension generators as electric energy sources.

The following conditions were used in all examples: During the spinning process, the pressure at the feed screw of the extruder was 40 bar and the pressure at the die 70 bar; the die temperature was 290° C. The diameter of the die orifice 4 was 0.3 mm; the die orifice 4 was round.

The spun filaments were wound on a spool of melamine resin by means of a winding device. The rate of winding was 200 m/min.

EXAMPLE 1

A die as shown in FIG. 1 was attached to the extruder. The electrode 2 of this die 3 was connected via a lead cable to the negative pole of an ungrounded and shortcircuit-protected constant voltage high tension generator 6 (direct current). The positive pole of this high tension generator 6 was grounded.

Die 3 according to FIG. 1 and also the extruder were electrically insulated from the ground.

The die-plate 11 according to FIG. 1 was made of quartz glass. The inlet funnel 16 according to FIG. 1 was made of brass. The electrode 2 according to FIG. 1 was made of a solid copper wire and, except for its point 1, was surrounded by a tube of quartz glass.

For the purpose of firmly connecting die-plate 11 to funnel 16, firmly connecting the die-plate holder 17 to the die-plate 11, for sealing the end of the quartz glass tube surrounding electrode 2 just before the point 1 of this electrode 2, and for sealing the area at which the quartz glass tube surrounding electrode 2 enters die 3, Acid Iron Cement No. 8 of the company Sepp Zeug KG, Boblingen-Tannenbert, Federal Republic of Germany, was used. Also the space 18 within the die 3 was filled with this cement, to the edge of feed funnel 16, and thus sealed.

The extruder was filled with additive-free polypropylene granulate, and heated. After the die temperature of 290° C. was reached, the spinning of an electret filament was begun. For this purpose, the high voltage generator was turned on and the electrode 2 was supplied with a voltage of $-3.8$ kV for 45 minutes; thereafter electrode 2 was supplied with a voltage of $-2.0$ kV for another 45 minutes.

The filament issuing from the die was passed through a cooling shaft, which was electrically insulated from the ground, and was cooled there by blowing with air at 20° C.

With a voltage of $-3.8$ kV and $-2.0$ kV, respectively, a polypropylene electret filament was obtained; the electret charges $Q_E$ expressed in nC (nano coulomb) and the mass-related electret charges $Q_E$/mass expressed in nC/g (nano coulomb per gram)—as a function of the storage time in each instance—are listed in Table 1.

TABLE 1

| Storage time after spinning in days (d) | Voltage at electrode $-3.8$ kV | | Voltage at electrode $-2.0$ kV | |
|---|---|---|---|---|
| | $Q_E$ (nC) | $Q_E$/mass (nC/g) | $Q_E$ (nC) | $Q_E$/mass (nC/g) |
| 0 | 5.4 | 0.30 | 4.0 | 0.20 |
| 2 | 4.3 | 0.20 | 2.3 | 0.11 |
| 7 | 3.4 | 0.17 | 3.0 | 0.15 |
| 15 | 3.4 | 0.17 | 3.7 | 0.19 |
| 30 | 4.6 | 0.23 | 4.3 | 0.21 |
| 90 | 5.1 | 0.26 | 3.7 | 0.18 |
| 150 | 5.7 | 0.28 | 3.4 | 0.17 |
| 370 | 6.3 | 0.31 | 4.0 | 0.20 |

EXAMPLE 2

The apparatus used in Example 1 was used. Also the procedure was the same as in Example 1, except that the extruder was filled with additive-free polyethylene terephthalate granulate instead of polypropylene granulate.

The electrode 2 was supplied with a voltage of $-3.0$ kV for 45 minutes and with a voltage of $-5.0$ kV for another 45 minutes. Then the polarity was reversed, i.e. electrode 2 of die 3 was connected by means of a lead cable with the positive pole of the ungrounded and shortcircuit-protected, constant voltage high tension generator (direct current), and the negative pole of this high tension generator was grounded. Then the electrode was provided with a voltage of $+4.0$ kV for 45 minutes.

With a voltage of $-3.0$ kV, $-5.0$ kV and $+4.0$ kV respectively, a polyethylene terephthalate electret filament was obtained; the mass-related electret charges $Q_E$/mass expressed in nC/g, as a function of the storage time, are listed in Table 2.

TABLE 2

| Storage time after spinning (d) | Voltage at electrode $-3.0$ kV $Q_E$/mass (nC/g) | Voltage at electrode $-5.0$ kV $Q_E$/mass (nC/g) | Voltage at electrode $+4.0$ kV $Q_E$/mass (nC/g) |
|---|---|---|---|
| 0 | 0.57 | 0.68 | 0.14 |
| 2 | 0.34 | 0.46 | 0.09 |
| 7 | 0.28 | 0.31 | 0.06 |
| 15 | 0.23 | 0.28 | 0.06 |
| 30 | 0.20 | 0.28 | 0.03 |
| 60 | 0.20 | 0.28 | 0.01 |

EXAMPLE 3

In this example, a die according to FIG. 4 was attached to the extruder. This die 3 and electrode 2 were the same as those used in Example 1.

The electrode 2 of this die 3 was connected by means of a lead cable to the negative pole of an ungrounded and shortcircuit-protected, direct current, high voltage generator 6. The positive pole of this high voltage generator was grounded.

Die 3 of FIG. 4 and also the extruder were electrically insulated against ground.

A hollow cylinder 12 was placed on the exit side of die 3 and 20 cm from it, in such a way that the filament, after leaving the die orifice 4, passed through the hollow cylinder in the center.

The hollow cylinder 12 consisted of a double-shell steel pipe 10 cm long, the inner wall of which was provided with oblique orifices 19 directed away from die 3. The outer diameter of the hollow cylinder 12 was 5 cm, the inner diameter 1 cm.

The hollow cylinder 12 had a feed line 20 for a cooling gas and on the side opposite this feed line 20, it had a connection by which the hollow cylinder 12 was connected via a lead cable with the negative pole of an ungrounded and shortcircuit-protected, direct current, high voltage generator 14. The positive pole of this high tension generator 14 was grounded. The hollow cylinder 12 was electrically insulated against the ground.

The extruder was filled with additive-free polyethylene terephthalate granulate and heated. After reaching the die temperature of 290° C., spinning of an electret filament was begun. For this purpose, high tension generator 6 was turned on and electrode 2 was supplied with a voltage of −3.0 kV for 45 minutes; thereafter electrode 2 was supplied with a current of −5.0 kV for another 45 minutes. At the same time, the hollow cylinder 12 was fed with a voltage of −0.75 kV by switching the high voltage generator 14 on. During the spinning process, air of 2° to 5° C. flowed through the cooling gas feed line 20 through the hollow cylinder 12, issuing from the oblique orifices 19 of the hollow cylinder and thus cooling the filament formed. The filament leaving the die was thereafter passed through a cooling shaft electrically insulated from the ground and was further cooled there by blowing with air at 20° C.

A polyethylene terephthalate electret filament was obtained at −3.0 kV and −5.0 kV at electrode 2; its mass-related electret charges $Q_E$/mass, expressed in nC/g, respectively, as a function of the storage time, are listed in Table 3.

TABLE 3

| Storage time after spinning (d) | Voltage at electrode −3.0 kV $Q_E$/mass (nC/g) | Voltage at electrode −5.0 kV $Q_E$/mass (nC/g |
|---|---|---|
| 0 | 1.54 | 2.14 |
| 2 | 1.28 | 1.57 |
| 4 | 0.86 | 1.14 |
| 6 | 0.71 | 0.86 |
| 8 | 0.57 | 0.74 |
| 10 | 0.46 | 0.68 |
| 20 | 0.40 | 0.63 |
| 30 | 0.40 | 0.63 |
| 60 | 0.34 | 0.57 |

EXAMPLE 4

The same apparatus as in Example 3 was used. Also the procedure was the same as in Example 3, except that the extruder was filled with additive-free polypropylene granulate instead of polyethylene terephthalate granulate.

Also the electrode 2 was supplied with a different voltage, namely −3.2 kV, for 45 minutes. Thereafter the polarity was reversed, i.e. electrode 2 of die 3 was connected, by means of a lead cable, to the positive pole of the ungrounded and shortcircuit-protected, direct current high voltage generator 6, and the negative pole of this high tension generator was grounded. Then the electrode was supplied with a voltage of +3.2 kV for 45 minutes. The hollow cylinder 12 was dealt with in the same manner: for the first 45 minutes of spinning, it was supplied with the ungrounded and shortcircuit-protected, direct current, high voltage generator 14 with a voltage of −0.75 kV. Then the polarity was reversed also there, i.e. the hollow cylinder 12 was connected, by means of a lead cable, to the positive pole of the ungrounded and shortcircuit-protected, direct current, high voltage generator 14 and the negative pole of this high tension generator was grounded. For the next 45 minutes of spinning the hollow cylinder 12 was then supplied with a voltage of +0.75 kV.

With −3.2 kV and +3.2 kV at electrode 2, a polypropylene electret filament was obtained; its mass-related electret charges $Q_E$/mass expressed in nC/g, as a function of storage time, are listed in Table 4.

TABLE 4

| Storage time after spinning (d) | Voltage at electrode −3.2 kV $Q_E$/mass (nC/g) | Voltage at electrode +3.2 kV $Q_E$/mass (nC/g) |
|---|---|---|
| 0 | 1.71 | 1.02 |
| 2 | 1.14 | 0.11 |
| 4 | 0.86 | 0.06 |
| 6 | 0.71 | 0.06 |
| 8 | 0.68 | 0.06 |
| 10 | 0.63 | 0.09 |
| 20 | 0.57 | 0.09 |
| 30 | 0.51 | 0.11 |
| 60 | 0.51 | 0.11 |

EXAMPLE 5

A die according to FIG. 3 was attached to the extruder. The electrode 9 of this die 3 was connected by means of a lead cable to the positive pole of an ungrounded and shortcircuit-protected, direct current, high voltage generator 6. The counter-electrode 10 of die 3 was connected by means of a lead cable to the negative pole of this high tension generator. In addition, the positive pole of high tension generator 6 was grounded.

The die 3 of FIG. 3 and also the extruder were electrically insulated from the ground.

The die-plate 11 was made of quartz glass. The inlet funnel 16 as in FIG. 3 was made of brass. The electrode 9 according to FIG. 3, consisted of a solid copper wire and was surrounded by a quartz glass tube together with its point 8. The counter-electrode 10 consisted of a copper plate of 0.25 cm² size, which was soldered to a solid copper wire which was surrounded only at its entrance to die 3 by a quartz glass tube.

For the firm connection of die-plate 11 with funnel 16, for the firm connection of the die-plate holder 17 with die-plate 11, for sealing the area at which the quartz glass tube surrounding electrode 9 enters the die, for sealing the quartz glass tube surrounding the solid copper wire of the counter-electrode 10, and for sealing the area at which the quartz glass tube surrounding the solid copper wire of the counter-electrode 10 enters the die, again Acid Iron Cement No. 8 of the company Sepp Zeug KG, Boblingen-Tannenberg, Federal Republic of Germany, was used. Also the space 18 within the die 3 was filled and then sealed with this cement.

The extruder was filled with additive-free polyethylene terephthalate granulate and heated. After reaching the die temperature of 290° C., spinning of an electret filament was begun. For this purpose, the high voltage generator was turned on and the counter-electrode 10 was supplied with a voltage of −4.0 kV for 45 minutes.

The filament issuing from die 3 was guided through a cooling shaft, which was electrically insulated from the ground, and was cooled there by blowing with air at 20° C.

A polyethylene terephthalate electret filament was obtained; its mass-related electret charges $Q_E$/mass, expressed in nC/g, are listed, as a function of the storage time, in Table 5.

TABLE 5

| Storage time after spinning (d) | $Q_E$/mass (nC/g) |
|---|---|
| 0 | 0.23 |
| 2 | 0.18 |
| 10 | 0.14 |
| 20 | 0.11 |
| 30 | 0.14 |
| 60 | 0.16 |
| 100 | 0.10 |
| 200 | 0.09 |
| 300 | 0.10 |

EXAMPLE 6

The same apparatus as in Example 5 was used. Also the procedure was the same as in Example 5, except that the electrode 9 of die 3 was connected by means of a lead cable to the negative pole of the ungrounded and shortcircuit-protected, direct current, high voltage generator, and this negative pole was also grounded. Further, the counter-electrode 10 of die 3 was connected by means of a lead cable to the positive pole of this high voltage generator. The counter-electrode 10 was supplied with a voltage of +4.0 kV for 45 minutes of spinning.

A polyethylene terephthalate electret filament was obtained; its mass-related electret charges $Q_E$/mass, expressed in nC/g, as a function of the storage time, are listed in Table 6.

TABLE 6

| Storage time after spinning (d) | $Q_E$/mass (nC/g) |
|---|---|
| 0 | 0.11 |
| 1 | 0.07 |
| 3 | 0.05 |
| 10 | 0.11 |
| 20 | 0.10 |
| 30 | 0.12 |
| 60 | 0.09 |
| 100 | 0.05 |

EXAMPLE 7

The same apparatus as in Example 5 was used. Also the procedure was the same as in Example 5, but the extruder was filled with additive-free polypropylene granulate instead of polyethylene terephthalate granulate. The electrode 9 of die 3 was connected via a lead cable to the positive pole of the ungrounded and short-circuit-protected, direct current, high voltage generator. The positive pole of this generator was also grounded. The counter-electrode 10 of die 3 was connected by means of a lead cable to the negative pole of the high voltage generator. The counter-electrode 10 was supplied with a voltage of −2.0 kV for 45 minutes of spinning. Then the polarity was reversed, i.e. the electrode 9 of die 3 was connected by means of a lead cable, to the negative pole of the ungrounded and short-circuit-protected direct current, high voltage generator, and this negative pole was also grounded. Further the counter-electrode 10 of die 3 was connected, via a lead cable, to the positive pole of this high voltage generator. The counter-electrode 10 was then supplied with a voltage of +2.0 kV for 45 minutes of spinning.

A polypropylene electret filament was obtained; its mass-related electret charges $Q_E$/mass, expressed in nC/g, are listed, as a function of the storage time, in Table 7.

TABLE 7

| Storage time after spinning (d) | Voltage at counter-electrode −2.0 kV $Q_E$/mass (nC/g) | Voltage at counter-electrode +2.0 kV $Q_E$/mass (nC/g) |
|---|---|---|
| 0 | 0.16 | 0.17 |
| 2 | 0.09 | 0.11 |
| 8 | 0.12 | 0.03 |
| 20 | 0.14 | 0.005 |
| 50 | 0.17 | 0.005 |
| 100 | 0.15 | 0.005 |
| 200 | 0.14 | 0.005 |

The die-plates described in the examples were provided with a round die orifice. However, die-plates with orifices of different shape can also be used, e.g. with star-shaped or triangular cross-section. Also die-plates with orifices for the production of hollow filaments or hollow fibers can be used.

According to the examples, only electret filaments were produced. However, within the scope of the invention, also electret fibers can be produced. For this purpose, for example, a gas stream of high velocity may be allowed to act on the molten, high molecular weight, thread-forming substance after its issuance from the die orifice (cf. e.g. French Patent Application No. 2,416,535); the issuing material is then drawn to such an extent that fibers are formed.

According to the invention, not only electret filaments and fibers, but also for example, electret tapes can be produced.

The electret structures produceable according to the invention may be successfully used for a variety of purposes. Thus, electret filaments and fibers according to the invention may be used, for example, for tobacco smoke filters, air filters, filters for mouth and nose masks, or filters for heating and air conditioning installations.

To test the filtering action of a filter made from the electret filaments according to the invention, the polypropylene electret filaments produced according to Example 1 were used. For comparison, a non-electret filament of polypropylene was used, which had been spun as in Example 1, but without the electrode 2 being supplied with voltage. From these polypropylene filaments spun with 0 kV, −2.0 kV and −3.8 kV respectively, strands of parallel polypropylene filaments were formed after a storage period of 7 days after spinning; these filament strands were inserted, lengthwise, into glass tubes of 8 mm inner diameter and cut off to a length of 20 mm, corresponding to the length of the glass tubes. The filters thus produced were selected for equal air resistance, namely 80 mm water column, at equal blowing velocity. Through these selected filters of equal air resistance, a defined air aerosol was passed. Thereafter, the aerosol quantities were determined. The results are given in Table 8.

TABLE 8

| Voltage at electrode (kV) | 0 | −2.0 | −3.8 |

TABLE 8-continued

| Electret charge $Q_E$ (nC) | 0 | 3.0 | 3.4 |
|---|---|---|---|
| Filter length (mm) | 20 | 20 | 20 |
| Filter inner diameter (mm) | 8 | 8 | 8 |
| Filament mass in filter (mg) | 560 | 529 | 509 |
| Air resistance of filter (in mm water column) | 80 | 80 | 80 |
| Mean blowing velocity of aerosol (m/s) | 0.35 | 0.35 | 0.35 |
| Aerosol content (mg): | | | |
| after the filter | 17.1 | 16.1 | 15.0 |
| in the filter | 4.9 | 5.9 | 7.0 |

As is clearly evident from Table 8, filters made from the electret filaments of the invention have a substantially better filtering action than the filters used for comparison without electret properties.

To test the water absorption of the electret filaments of the invention, the polypropylene electret filament produced according to Example 1 with −3.8 kV was used. For comparison, a non-electret filament of polypropylene was used which had been spun as in Example 1, but without applying voltage to electrode 2.

Of these filaments, spun with 0 kV and −3.8 kV respectively, bundles were formed after a storage period of 370 days after spinning (the 370-day storage was carried out in dry atmosphere).

The polypropylene filament bundles were stored in a water vapor atmosphere (relative humidity 100%) on a grounded perforated plate. The water absorption (in percent) of the bundles was determined gravimetrically. The results are given in Table 9.

TABLE 9

| | Water absorption (%) |
|---|---|
| Non-electret filament | 0.2 |
| Electret filament with $Q_E$/mass 0.31 nC/g | 5.6 |

Table 9 shows in an impressive manner, the high water absorption capacity of the electret filaments of the invention.

The advantages achieved with the invention as compared with the state of the art are the following:

With the method and apparatus of the invention lower voltage is needed for electret formation as compared with the known methods and apparatuses for corresponding continuous production of electrets;

With the method and apparatus of the invention, it is easier to introduce an electric charge into the interior of the structures as compared with the known methods and apparatuses;

With the method and apparatus according to the invention, a correct dosing and centering of the electric charges is more possible as compared with the known methods and apparatuses. Thus, according to the invention, it is easy to achieve the desired electron enrichment or depletion along the longitudinal axis of the filaments, fibers or the like;

With the method and apparatus according to the invention, the heat required for melting the high molecular, thread-forming substances is utilized directly and completely also for electret production.

What is claimed is:

1. A method for the production of electret filaments, fibers or the like from a thread-forming, high molecular weight substance, which consists of melting said thread-forming, high molecular weight substance, and extruding said substance in the molten state through a die orifice, electrically charging, with either a negative or a positive sign, and electrically polarizing said substance for the production of a stable electric field originating from the formed filaments, fibers or the like, cooling the formed filaments, fibers or the like, and the step of electrically charging, with either a negative or a positive sign, and the electric polarization for the production of a stable electric field originating from the formed filaments, fibers or the like is effected immediately prior to or during the issuance of said thread-forming, high molecular weight substance from the die orifice on said substance, while it is in the molten state.

2. Method according to claim 1, wherein each of the formed filaments, fibers or the like is exposed immediately after its issuance from the die orifice to an electric field which exerts on the carriers of electric charge present in or on the filaments, fibers or the like a force perpendicular to and in the direction of the respective longitudinal axis of the filaments, fibers or the like.

3. Method according to claim 2, wherein the formed filaments, fibers or the like are simultaneously cooled.

4. An apparatus for the production of electret filaments, fibers or the like from a thread-forming, high molecular weight substance, which comprises:
   (a) means for melting said thread-forming substance;
   (b) means for extruding said substance in the molten state through a die provided with orifices;
   (c) means for electrically charging and for inducing polarization in close proximity with the die orifice; and
   (d) cooling means for the electret filaments and textile fibers.

5. The apparatus according to claim 4, wherein the means for electric charging and for inducing polarization consist of an electrode provided with at least one point, said electrode being coated with or surrounded by an electrically insulating material stable to the conditions prevailing inside the die, except for at least said one point, said one point being disposed in the interior of the die directly in front of the die orifice or protruding into a die orifice, said electrode being connected to one terminal of a source of electric energy, the other terminal of said source of electric energy being grounded.

6. The apparatus according to claim 4, wherein the means for electrically charging and inducing polarization consist of an electrode provided with at least one point, said electrode being completely coated with or surrounded by an electrically insulating material stable to the conditions prevailing inside the die, said one point being disposed within the die directly in front of the die orifice or protruding into a die orifice, and of a counter-electrode which is not coated with or surrounded by an electrically insulating material and which is disposed within the die not directly in front of the die orifice or protruding into the die orifice, the electrically insulated electrode being connected to one terminal of a source of electrical energy and the electrically not insulated counter-electrode being connected to the other terminal of said source of electrical energy, and the terminal of the source of electrical energy with which the electrically insulated electrode is connected being also grounded.

7. The apparatus according to claim 4, which comprises a die-plate containing the die orifices, or the entire die, which die plate consists of:
   either of an electrically insulating material stable to the conditions prevailing inside the die;

or of an electrically conductive material stable to the conditions prevailing inside the die;

the die plate or the entire die being then insulated from the ground.

8. Apparatus according to claim 4, which is provided on the exit side of the die directly contiguous to each die orifice and axially centered therewith, but without being in direct contact with the die, with at least one hollow cylinder consisting of electrically conductive material, said hollow cylinder being connected with one terminal of a source of electrical energy and the other terminal of the source of electrical energy being grounded.

9. Apparatus according to claim 8, wherein the hollow cylinders located on the exit side of the die also serve as cooling means for cooling the formed filaments, fibers or the like.

10. Apparatus according to claim 8, wherein said source of electrical energy produces an electric field inside said hollow cylinder, said apparatus producing no electric field between said die orifice and said cylinder.

* * * * *